United States Patent [19]

Belart

[11] Patent Number: 4,649,707
[45] Date of Patent: Mar. 17, 1987

[54] BRAKE-PRESSURE GENERATOR HAVING AN IMPROVED MASTER CYLINDER AND BOOSTER FOR AN AUTOMOTIVE HYDRAULIC BRAKE SYSTEM

[75] Inventor: Juan Belart, Walldorf, Fed. Rep. of Germany

[73] Assignee: Alfred Teves GmbH, Frankfurt am Main, Fed. Rep. of Germany

[21] Appl. No.: 709,558

[22] Filed: Mar. 8, 1985

[30] Foreign Application Priority Data

Mar. 10, 1984 [DE] Fed. Rep. of Germany ....... 3408873

[51] Int. Cl.$^4$ .......... B60T 13/20; B60T 11/20; F15B 7/04; F15B 7/08
[52] U.S. Cl. ............................ 60/550; 60/562; 60/578; 60/589
[58] Field of Search .................. 60/547.1, 574, 576, 60/577, 578, 589, 582, 590, 562

[56] References Cited

U.S. PATENT DOCUMENTS

| | | | |
|---|---|---|---|
| 3,407,601 | 10/1958 | Beck | 60/576 X |
| 3,855,797 | 12/1974 | Papiau | 60/547.1 |
| 4,050,251 | 9/1977 | Carre et al. | 60/574 X |
| 4,341,076 | 7/1982 | Steffes | 60/547.1 |
| 4,472,942 | 9/1984 | Nomura et al. | 60/589 X |

FOREIGN PATENT DOCUMENTS

| | | | |
|---|---|---|---|
| 44-24814 | 10/1960 | Japan | 60/547.1 |
| 1345951 | 2/1974 | United Kingdom | 60/547.1 |

Primary Examiner—Robert E. Garrett
Assistant Examiner—George Kapsalas
Attorney, Agent, or Firm—James B. Raden; William J. Michals

[57] ABSTRACT

A brake pressure generator for an automotive hydraulic brake system, wherein a booster piston (13) which is displaceable by an auxiliary hydraulic pressure in the direction of actuation is adapted to mechanically strike an annular piston (18) and is displaceable in the actuating direction. Sealingly guided within the annular piston (18) is a master cylinder piston (25) confining at least one working chamber (23) separable from an unpressurized supply reservoir (32), by a valve (31) controllable in way-responsive manner. Annular piston (18) is of a stepped-piston configuration and is provided with a section (19) facing pedal actuation (6) and being of a smaller diameter. According to the invention it is suggested that the pedal-sided section (19) of annular piston (18) is of a smaller diameter than that of the booster piston (13) to confine an annular chamber (22) which via a check valve (33) adapted to be switched open toward working chamber (23), is in communication with working chamber (23). A normally open two position-two way valve (42) is connected to annular chamber (22) and is adapted to be switched in response to the pressure in the booster chamber (5) into a locking position, which valve (42), in turn, is in communication with an unpressurized supply reservoir (32). Such a configuration will involve the advantage that a master cylinder piston (25) of a relatively small diameter mas be used. The ability for the booster piston (13) to be mechanically actuated by the brake pedal (6) through push rod (10) provides a safeguard in the event of a failure of the auxiliary pressure source and insures a minimum deceleration of the motor vehicle.

6 Claims, 1 Drawing Figure

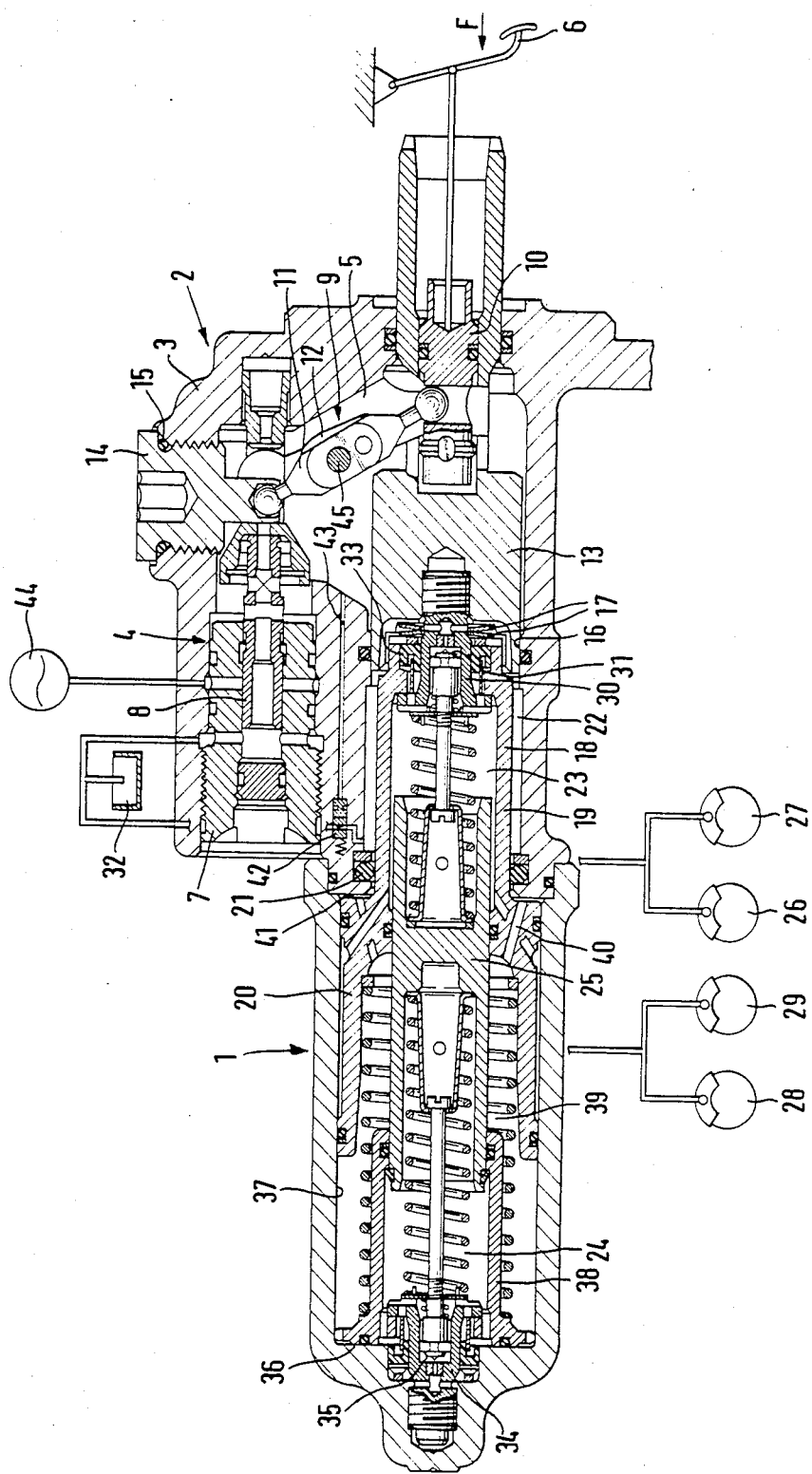

BRAKE-PRESSURE GENERATOR HAVING AN IMPROVED MASTER CYLINDER AND BOOSTER FOR AN AUTOMOTIVE HYDRAULIC BRAKE SYSTEM

BACKGROUND OF THE INVENTION

The present invention relates to a brake pressure generator for an automotive brake system, wherein a booster piston displaceable by an auxiliary hydraulic pressure, in the direction of actuation is adapted to mechanically strike an annular piston and is displaceable in the direction of actuation. A master cylinder piston is sealingly guided within that annular piston to confine at least one working chamber separable from an unpressurized supply reservoir by way of a valve arrangement controllable in way-responsive manner, with the annular piston being of a stepped-piston configuration and having a section facing the pedal actuation which is of a smaller diameter.

Systems characterized by the foregoing features are known. In these systems, the brake pressure generator comprises a hydraulic booster in the pressure chamber of which is adjustable, by way of a brake valve, an auxiliary hydraulic pressure proportional to the actuating force respectively exerted on the brake pedal. A component part of the hydraulic booster is a booster piston sealingly and displaceably disposed in a bore of the hydraulic booster to displace a master cylinder piston in the direction of actuation as soon as an adequately high pressure has built up in the pressure chamber of the hydraulic booster.

The master cylinder piston, in turn, is sealingly guided in an axially displaceable manner in an annular piston, whereas the open end of the annular piston, facing away from the pedal is sealingly disposed in an axially displaceable manner on another piston so as to confine a working chamber by the annular piston, the master cylinder piston and the piston getting into contact with the opened end of the annular piston, which working chamber, normally, is in communication with an unpressurized supply reservoir through a brake valve disposed in the master cylinder piston. Conversely, the said working chamber is in communication with the wheel brake of a vehicle wheel to be decelerated.

If in the afore-described brake system an operating force is applied to the brake pedal, a hydraulic pressure will build up in the pressure chamber of the hydraulic booster which, above a predetermined pressure level, causes a displacement of the booster piston in the actuating direction involving an axial displacement of the master cylinder piston within the annular piston. It is already with a minor axial displacement of the master cylinder that the central valve disposed within the master cylinder piston is closed to thereby block a hydraulic connection between the unpressurized supply reservoir and the working chamber of the brake pressure generator. In a further displacement of the master cylinder piston, the working chamber is pressurized to thereby supply a corresponding hydraulic pressure to the wheel brake of the vehicle wheel to be decelerated, causing a brake effect to take place.

After the booster piston and the master cylinder piston, respectively having performed a structurally predetermined movement of displacement and after a corresponding hydraulic pressure having built up in the working chamber of the brake pressure generator, the booster piston will get into abutment with an annular shoulder of the annular piston to simultaneously displace the latter in the actuating direction. The displacement of the annular piston does not offer any substantial force against the pedal movement as the front face of the annular piston facing away from the brake pedal is exposed to a space normally in communication with an unpressurized supply reservoir. An auxiliary hydraulic pressure may be applied to the space confined by the front face of the annular piston, facing away from the pedal, in predetermined brake situations, via corresponding valve means, so that in given conditions, restoring of the booster piston of the hydraulic booster might occur.

In the foregoing, the hydraulic pressure built up in the working chamber is directly proportional to the displacement travel of the master cylinder piston. As the displacement travel of the master cylinder piston as a result of the mechanical coupling to the booster piston of the hydraulic booster also is proportional to the displacement travel of the booster piston, on the one hand, correspondingly large displacement movements of the booster piston of the hydraulic booster are required whereas, on the other hand, relatively large diameters will have to be selected for the master cylinder piston in order to feed a corresponding pressure fluid volume to the wheel brakes.

It is therefore an object of the present invention to configure a brake pressure generator of the type described in such a manner so as to cause, with an intact external energy supply, in a short displacement travel of the booster piston a relatively high pressure rise in the working chamber of the brake pressure generator.

SUMMARY OF THE INVENTION

In accordance with the invention, that object is attained in that the pedal-sided section of the annular piston is of a diameter smaller than the one of the booster piston to confine an annular chamber which via a check valve adapted to be opened over the working chamber, is in communication with the working chamber, and that a two position-two way valve normally opened and, in response to the pressure prevailing in the booster chamber, adapted to be switched into a locking position, is connected to the annular chamber, which valve, in turn, is in communication with the unpressurized supply reservoir. With such a configuration, the central valve disposed in the master cylinder piston is closed in known manner already with a minor displacement travel of the booster piston and at a corresponding pressure in the booster chamber so as to hydraulically separate the working chamber of the brake pressure generator from the unpressurized supply reservoir. If the booster piston of the hydraulic booster is further displaced in the actuating direction, the annular space is reduced in volume, with the excessive volume via the check valve adapted to be switched open over the working chamber being fed to the working chamber. During such a braking operation, the annular piston is displaced therewith in the actuating direction. The volume by which the annular chamber is reduced which, via the check valve is fed over the working chamber of the brake pressure generator, will, admittedly, result in a relative movement of the master cylinder piston over the annular piston, with the master cylinder piston covering a comparatively longer distance than the booster piston. This will envolve the advantage that the brake system of the invention may be minimized in terms of the diameters of the master cylinder pistons because it is to be assumed that with an intact external energy source, the pressure of the external energy source will be sufficient to displace the master cylinder piston of smaller diameter in the actuating direction. In the event of a failure of the auxiliary pressure source, no pressure will build up in the auxiliary pressure chamber of the hydraulic booster thus enabling the two position-two way valve in communication with the annular chamber to maintain its passage position in which the annular chamber is in communication with the unpressurized supply reservoir. Consequently, the annular piston may be displaced therewith in the actuating direction with no substantial force being offered against the pedal actuation. The diameter of the master cylinder piston, in the brake pressure generator of the invention, is so dimensioned that also by a mechanical force alone acting upon the brake pedal, a hydraulic pressure can be allowed to develop in the working chamber of the brake pressure generator which, in any case, will be sufficient for a minimum deceleration of the motor vehicle. A particularly simple embodiment of the brake pressure generator as described will be attained if the check valve is a sealing sleeve. Such a sealing sleeve will incur low costs, be safe in operation and easy to mount.

For controlling the two position-two way valve adapted to be switched in response to the pressure in the pressure chamber of the hydraulic booster, basically, there are several alternatives available. It is particularly simple and of advantage for the two position-two way valve to be hydraulically controllable, it being provided in simple manner that the drive of the valve is a piston which, via a corresponding housing passageway, is in communication with the pressure chamber of the hydraulic booster, with the two position-two way valve being biased by a spring force into the passage position. According to another preferred embodiment of the subject matter of the application, the annular piston is resiliently supported on the booster piston. A suitable dimension will cause the central valve to close before the maximum possible spring travel has been covered.

With a view to a multiple-circuit configuration of a brake system, the brake pressure generator according to the subject matter of the application can be so configured as to confine another work chamber by a front face of the master cylinder piston facing away from the pedal. Preferable, in such an embodiment, the master cylinder piston may be of a largely symmetrical configuration, with the central valve facing the second working chamber being disposed on the bottom of the master cylinder bore of the brake pressure generator.

According to another advantageous embodiment of the subject matter of the application, at least one cup spring is clamped between the booster piston and the annular piston, through which the booster piston and the annular piston, in the brake releasing position, are held at a defined axial space from one another.

BRIEF DESCRIPTION OF THE DRAWING

One example of embodiment of the present invention will now be described in greater detail by way of a sectional view as illustrated in the drawing in which the single FIGURE illustrates a brake pressure generator in accordance with the present invention.

DETAILED DESCRIPTION

In the drawing, a tandem master cylinder indicated generally at 1 is operable by a hydraulic booster 2. Tandem master cylinder 1 and hydaulic booster 2 are accommodated in a housing 3. Hydraulic booster 2 as shown in the right-hand section of the drawing, substantially comprises a brake valve 4 and a pressure chamber 5, with a hydraulic pressure being controllable into pressure chamber 5 of the hydraulic booster via a brake pedal 6, which hydraulic pressure is proportional to the actuating force F respectively applied to brake pedal 6.

Brake valve 4 is formed as a slide valve and is substantially comprised of a valve housing 7 in which is located a control slide valve 8. Control slide valve 8 is displaceable in a bore of valve housing 7. The control slide valve, via a double lever 9, is in mechanical contact with a push rod 10 to which pressure may be directly applied via a brake pedal 6. A first lever 11 of lever actuation 9, on the one hand, is disposed in housing 3 and, on the other hand, engages a recess of the push rod. Pivotally disposed on first lever 11 is a second lever 12 which, on the one hand, is supported on control slide 8 of brake valve 4 and, on the other hand, is supported on booster piston 13 of hydraulic booster 2. The upper end of first lever 11 is in the form of a ball received by a screw-in member 14 firmly screwed into housing 3 by using a seal 15.

Booster piston 13 is sealingly guided in a bore 16 in sealingly slidable manner and, spaced by cup springs 17, is supported on an annular piston 18. Annular piston 18 is of a stepped-piston configuration and includes a pedal-sided section 19 of smaller diameter and a section 20 of larger diameter, facing away from the pedal. The two sections 19, 20 of annular piston 18 are sealed by an annular seal 21 against one another and against the housing. Section 19 of annular piston 18 has an outer diameter smaller than the diameter of the booster piston so as to confine through piston section 19 of smaller diameter, housing 3 and the booster piston, an annular chamber 22 which, in the event of a displacement in the direction of actuation of booster piston 13 and annular piston 18, will reduce in volume.

Moreover, two working chambers 23, 24 are provided in the tandem master cylinder 1, with both working chambers being confined by a master cylinder piston 25, and with working chamber 23, via corresponding pressure lines, being hydraulically connected to wheel brakes 26, 27 of a motor vehicle. Working chamber 24, via corresponding pressure lines, is hydraulically connected to wheel brakes 28, 29 of the motor vehicle. For example, wheel brakes 26, 27 are disposed on one axle and wheel brakes 28, 29 are located on another axle of the motor vehicle. Also, it is possible for wheel brakes 28, 29 and wheel brakes 26, 27, respectively, to be disposed on the motor vehicle in diagonally opposite relationship.

Screwed into the end facing away from the pedal of booster piston 13 of hydraulic booster 2 is an insert 30 forming a component part of central valve 31. It is the function of central valve 31 to interrupt already with a minor displacement travel of booster piston 13 a hydraulic connection between working chamber 23 and an unpressurized supply reservoir 32. Provided between insert 30 and section 19 of annular piston 18 is a sealing sleeve 33 acting as a check valve and being suitable to establish a hydraulic connection between annular chamber 22 and working chamber 23 of tandem master cylinder 1. Working chamber 24 of tandem master cylinder 1 is confined by another insert member 34 to receive another central valve 35. Supported on bottom 36 of cylindrical bore 37 of the tandem master cylinder is a sleeve 38 in which is slidably guided in sealing manner the end facing away from brake pedal 6 of the master cylinder piston. Sleeve 38, master cylinder piston 25 and housing 3 confine another annular chamber 39 which, via a housing passageway 40, is hydraulically connected to an annular chamber 41.

Connected to annular chamber 22 is a two position-two way valve 42 controllable by the pressure prevailing in pressure chamber 5 of the hydraulic booster 2 and, normally, at atmospheric pressure, in pressure chamber 5 taking a position in which the annular chamber 22 is connected to the unpressurized supply reservoir 32. The drive of the two position-two way valve 42, via a housing passageway 43, is in communication with pressure chamber 5 of the hydraulic booster 2 so as to cause the two position-two way valve 42 upon an application of pressure to pressure chamber 5 of the hydraulic booster to take a control position in which annular chamber 22 is separated from unpressurized supply reservoir 32.

The operation of the brake system as described will now be explained in greater detail starting with the brake release condition in which all mobile parts of the brake pressure generator take the position as shown in the drawing. In the brake release condition, pressure chamber 5 of the hydraulic booster 2 is in communication with the unpressurized supply reservoir 32 so that, on the one hand, booster piston 13 will remain in its resting position and, on the other hand, a connection between a pressure source 44 and pressure chamber 5 of hydraulic booster 12 is locked by control slide 8 of the brake valve. If an actuating force F is applied to brake pedal 6, push rod 10 of hydraulic booster 2 will displace in the actuating direction, with the lower end of the first lever 11 being swung in clockwise direction about the bearing point thereof at the upper end. As the second lever 12 through a bolt 45 is disposed on the first lever and supported control slide 8 of brake valve 4 and on booster piston 13, in an axial displacement of push rod 10, the second lever 12 of the double lever 9 is swung in counter clockwise direction so as to enable control slide 8 of the brake valve to perform a corresponding movement in the direction of actuation. A displacement of control slide 8 first results in that the pressure chamber 5 of the hydraulic booster 2 is separated from the unpressurized supply reservoir 32. A continued displacement of control slide 8 of brake valve 4 causes the pressure fluid passageways between the pressure source 44 and the pressure chamber 5 of the hydraulic booster 2 to open so as to adjust within the pressure chamber 5 a hydraulic pressure corresponding to the actuating force F respectively applied to the brake pedal 6 and the push rod 10, respectively.

After the pressure adjusted in pressure chamber 5 of hydraulic booster 2 exceeds a predetermined level, the switch position of two position-two way valve 42 will change so as to separate annular space 22 from unpressurized supply reservoir 32. Moreover, booster piston 13 of hydraulic booster 2 will displace in the actuating direction so as to cause central valve 31 to close to thereby permit a pressure build-up in the working chamber 23 of the tandem master cylinder.

In the event of a pressure rise in pressure chamber 5 of hydraulic booster 2, the annular piston 18 will be displaced with booster piston 13 in the actuating direction, with a reduction in volume of the annular chamber 22 taking place. The excessive volume of annular chamber 22 escapes via sealing sleeve 33 into working chamber 23 of the tandem master cylinder so as to displace master cylinder piston 25 in the actuating direction and to close the central valve associated to the second working chamber 24 of the tandem master cylinder 1, it being notable that the master cylinder piston 25 displaces at a higher speed in the actuating direction because additional pressure fluid is discharged from the annular chamber 22 and, via sealing sleeve 33, is supplied to working chamber 23 of the tandem master cylinder. The pressure generated in this manner in working chambers 23, 24 of tandem master cylinder 1 is passed to wheel brakes 26, 27, 28, 29 of the motor vehicle to there cause a corresponding deceleration. In such a deceleration, an equalization of volume between chambers 39 and 41, via housing passageway 40, will be permitted. In the following it is assumed that the pressure fluid source 44 has not supplied the required pressure. In the event that in the brake system described such a defect has occurred, pressure chamber 5 of hydraulic booster 2 cannot be pressurized thereby causing the hydraulically operable 2/2-way valve 42 to maintain an open position in which the annular chamber 22 is permanently in communication with the unpressurized supply reservoir 32.

If in the event of such a failure, an operating force F is applied to the brake pedal 6, the said force, via push rod 10, is transferred to the booster piston which, after having overcome the friction of the seals getting into contact therewith, is displaced in the actuating direction. After a relatively short displacement travel of booster piston 13 of hydraulic booster 2, booster piston 13, with central valve 31 closed, will strike annular piston 18 so as to pressurize working chamber 23 and wheel brakes 26, 27, respectively. Owing to the pressure generated in working chamber 23 of the tandem master cylinder, moreover, a displacement of master cylinder 25 in the actuating direction will take place so as to cause central valve 35 to equally close and to permit a pressure built-up in working chamber 24. Accordingly, also in the event of a failure of the auxiliary pressure source 44, a pressure build-up in working chamber 24 of tandem master cylinder 1 and in wheel brakes 28, 29 connected to working chamber 24 will be permitted.

In the brake release operation, the motions as described will be inverted until all parts have again taken the position as shown in the drawing.

What is claimed is:

1. A brake pressure generator including a multi-bored, multi-ported housing for an automotive hydraulic brake system including in one of said bores a brake valve having a valve housing (7) and a co-axial control slide valve (8) disposed in said housing, linkage means connected to a push rod means (10) and actuated by a brake pedal for control and actuation of said slide valve, and further including in a second of said bores a first chamber communicating with and adapted to accept an auxiliary hydraulic pressure, a booster piston in said second bore and confronting said chamber and its associated pressure, an annular piston in said second bore and coaxially disposed with respect to said booster piston, said booster piston being displaceable in the actuating direction by said auxiliary hydraulic pressure and adapted to mechanically strike said annular piston, said booster piston also being mechanically movable in the actuating direction by pedal pressure through said push rod against said a booster piston, a master cylinder piston sealingly guided within said annular piston to define therein at least one working chamber, an unpressurized supply reservoir communicating with said at least one working chamber and separated therefrom by a valve arrangement hydraulically controlled and responsive to conditions in said first mentioned chamber, said annular piston being of a stepped-piston configuration and being provided with a section (19) facing the pedal actuation that has a smaller diameter than its other section facing the opposite direction, said booster piston being recessed at the end facing said annular piston, said annular piston smaller section (19) having a diameter smaller than said recess diameter of said booster piston (13) and acceptable therein and defining an annular chamber (22) between the housing second bore, piston section (19) and the booster (13), said annular chamber (22) being in communication with the working chamber (23) but interrupted by means of a check valve (33) interposed therebetween which is normally open toward the working chamber (23); said first mentioned valve arrangement including a two position-two-way valve (42) connected between said annular chamber (22) and said first mentioned booster chamber (5), said two position-two way valve (42) being in a normally open position and adapted to be switched in response to an increase in pressure in the booster chamber (5) into a closed position from its normally open position in communication with the unpressurized supply reservoir (32), thereby providing a pressure generator which is generally effective through movement of said booster piston by either hydraulic means or by mechanical means.

2. A brake pressure generator according to claim 1, wherein said check valve (33) is a sealing sleeve.

3. A brake pressure generator according to claim 1, wherein said two position-two way valve (42) is actuated by hydraulic means.

4. A brake pressure generator according to claim 1, wherein said annular piston (18) includes means connected to and resiliently supported on said booster piston (13).

5. A brake pressure generator according to claim 4, wherein a second working chamber (24) is defined by the opposite end of said master cylinder (25) facing away from the pedal and said first chamber, within said bore.

6. A brake pressure generator according to claim 4, wherein at least one resilient cup spring (17) is clamped between the booster piston (13) and the annular piston (18) at their connection, whereby said booster piston (13) and said annular piston (18), in the brake release position, are held in axially spaced relation with respect to one another.

* * * * *